(12) United States Patent
Asahina et al.

(10) Patent No.: US 7,022,432 B2
(45) Date of Patent: Apr. 4, 2006

(54) PRISMATIC SEALED BATTERY MODULE

(75) Inventors: Takashi Asahina, Toyohashi (JP);
Shinji Hamada, Toyohashi (JP);
Shinsuke Fukuda, Moriguchi (JP);
Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 371 days.

(21) Appl. No.: 10/213,799

(22) Filed: Aug. 6, 2002

(65) Prior Publication Data

US 2003/0027044 A1  Feb. 6, 2003

(30) Foreign Application Priority Data

Aug. 6, 2001  (JP) .............................. 2001-237752

(51) Int. Cl.
*H01M 2/02* (2006.01)
*H01M 2/30* (2006.01)

(52) U.S. Cl. .................. 429/179; 429/153; 429/181

(58) Field of Classification Search ............... 429/153, 429/178, 179, 181
See application file for complete search history.

(56) References Cited

U.S. PATENT DOCUMENTS 4,150,201 A    4/1979  Silveyra
4,882,242 A   11/1989  Kilb et al.
5,302,473 A *  4/1994  Bennett ..................... 429/160

FOREIGN PATENT DOCUMENTS

| EP | 0 962 993 | 12/1999 |
| EP | 1 087 449 | 3/2001 |
| EP | 1 096 582 | 5/2001 |
| EP | 1 211 739 | 6/2002 |
| FR | 1 098 879 | 8/1955 |
| GB | 790025 | 1/1958 |
| JP | 59-108264 | 6/1984 |
| JP | 2001-093503 | 4/2001 |
| JP | 2001-093508 | 4/2001 |
| JP | 2002093402 A * | 3/2002 |
| JP | 2002231214 A * | 8/2002 |

* cited by examiner

*Primary Examiner*—Gregg Cantelmo
(74) *Attorney, Agent, or Firm*—Jordan and Hamburg LLP

(57) ABSTRACT

A prismatic sealed battery module includes: a prismatic battery case; an electrode plate group constituted by alternately layering positive and negative electrode plates with a separator arranged therebetween; and an electrolyte. The positive or negative electrode plates protruding from each end face of the electrode plate group are bonded to a collector member. A metal connector is fixed to the central part of the collector member facing the inner surface of the side end wall of the battery case. The collector member is connected, at the metal connector, to an external terminal using an externally connecting bolt.

14 Claims, 5 Drawing Sheets

PRISMATIC SEALED BATTERY MODULE

The present disclosure relates to subject matter contained in priority Japanese Patent Application No. 2001-237752, filed on Aug. 6, 2001, the contents of which is herein expressly incorporated by reference in its entirety.

BACKGROUND OF THE INVENTION

1. Field of the Invention

The present invention relates to a prismatic sealed battery module, and more particularly to a prismatic sealed battery module which succeeds in reducing connection resistance with respect to an external terminal.

2. Description of Related Art

A conventional rechargeable battery module is typically composed of a plurality of cells connected together to obtain a desired electric power capacity. Such a rechargeable battery module is constructed by stackingly arranging a plurality of prismatic cells such that longer side surfaces of battery cases are arranged opposite each other, followed by placing an end plate outside the battery case of each endmost cell, further followed by binding them together with a tie band. In the rechargeable battery module, each of the cells is connected, via a lead extended upward from an upper end of its electrode plate, to an external terminal attached to a cover of the battery case. Then, the external terminals are connected with each other by connection plates, thus effecting interconnection between the cells.

In this conventional construction, due to the complexity of interconnection between the cells, a large number of constitution parts are required. Moreover, the connection paths between the cells are long and the connection points are large in number. This leads to an undesirable increase in the cost. In addition, occurrence of unduly large part resistance makes it difficult to improve power output and service life characteristics in the rechargeable battery module.

Figure 5:
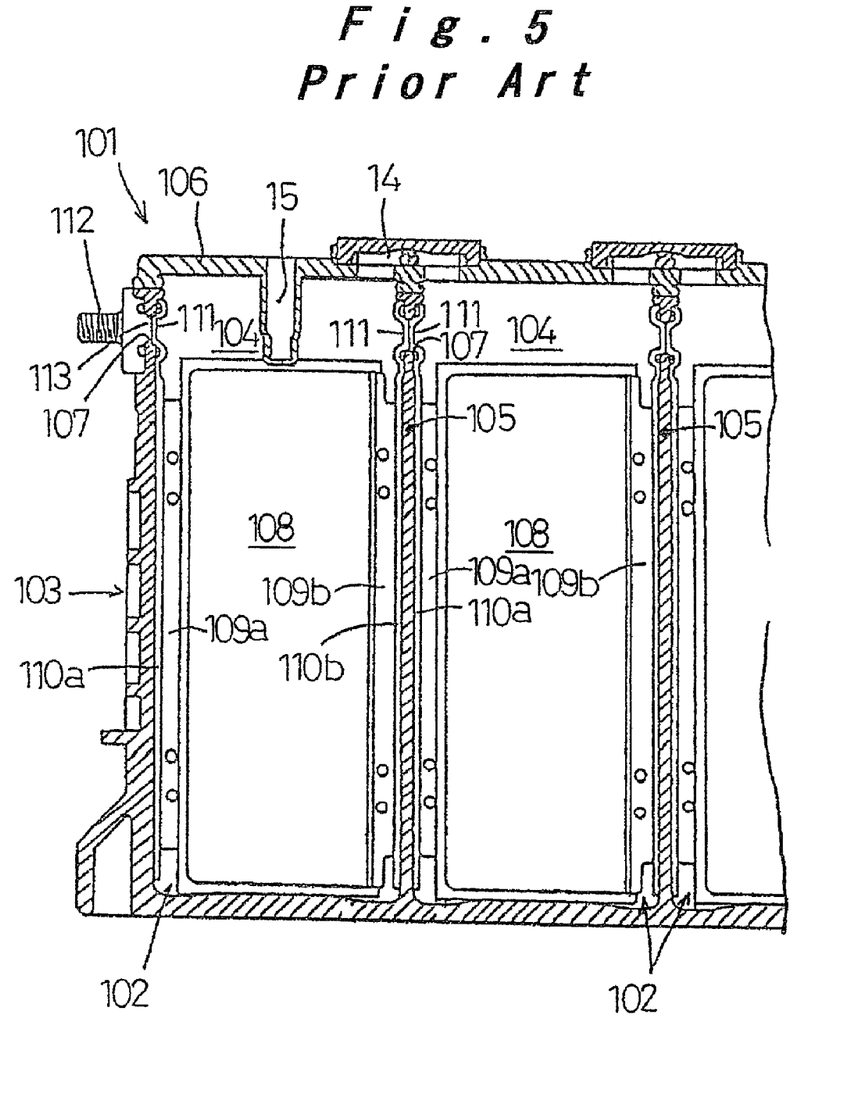
FIG. 5 is a partial longitudinal sectional view of a prismatic sealed battery module of a conventional example.

In light of the foregoing, the present applicant has previously proposed a prismatic sealed battery module 101 shown in FIG. 5 that incorporates a plurality of cells 102. In the figure, the reference numeral 103 denotes a prismatic battery case. The prismatic battery case 103 is formed in the shape of a flat prism by integrally and contiguously arranging prismatic battery cases 104 of the cells 102 with a shorter side surface and a longer side surface, each of whose shorter side surfaces is common to adjacent such battery cases as a partition wall 105. Upper openings of the battery cases 104 are sealed with an integrally-formed cover 106. Connection holes 107 are formed outside the shorter side surface of each endmost battery case 104 and in the upper part of the partition wall 105 between adjacent battery cases 104.

The battery cases 104 each accommodate an electrolyte and an electrode plate group 108 formed by layering rectangular positive and negative electrode plates with a separator interposed therebetween. Thereby, the cell 102 is realized. Part of the positive and negative electrode plates of the electrode plate group 108 extend sideways in mutually different directions, so as to form leads 109a and 109b. The leads 109a and 109b of the positive and negative electrode plates have their edges connected to collector plates 110a and 110b, respectively, by welding or other means.

At an upper part of the collector plate 110a, 110b is protrudingly formed a connecting projection 111 which is fitted in the connection hole 107. Interconnection between adjacent battery cases 104 is effected by connecting together the connecting projections 111 of the positive/negative collector plates 110a and 110b by welding. Fitted in the connection hole 107 formed on the outer shorter side surface of the endmost battery case 104 is a positive or negative external terminal 112, whose connecting projection 113 is connected to the connecting projection 111 of the collector plate 110a or 110b by welding. In this way, a plurality of the cells 102 accommodated in the prismatic battery case 103 are connected in series with each other, so that power output is produced between the endmost external terminals 112.

However, the construction shown in FIG. 5 has the following disadvantage. Although a current-carrying path from the positive or negative electrode plate, through its respective lead 109a or 109b, to the collector plate 110a or 110b can be made short, in order to complete the current-carrying path between the collector plate and the external terminal 112, current must take a path reaching the upper end of the collector plate 110a, 110b first, and then pass through a welding point between the two front ends of the connecting projection 111 of the upper end and the connecting projection 113 of the external terminal 112. Consequently, the length of the entire current-carrying path becomes unduly long, and also the connection resistance is increased because of the necessity of energizing a portion having a small sectional area, giving rise to a-great loss induced by electrical connection resistance.

Another problems with the construction are that: since interconnection between the cells 102 is effected by weld-connecting together the front ends of the connecting projections 111 respectively formed at the upper ends of the collector plates 110a and 110b, the connection path must be made to take a detour, resulting in an increase in the length of the connection path; since the weld-connection is made only at one point, the resistance is increased; using the collector plates 110a and 110b leads to an increase in the cost; and the collector plates 110a and 110b are arranged on both sides of the electrode plate group 108, and their upper parts need to be so formed as to extend beyond the upper end of the electrode plate group 108, resulting in an increase in the volume of the battery case 104.

SUMMARY OF THE INVENTION

The present invention has been devised in light of the above-mentioned problems with the conventional art, and accordingly an object of the present invention is to provide a prismatic sealed battery module in which connection resistance between an electrode plate group and an external terminal is suppressed to reduce a loss induced by electrical connection resistance.

To achieve the above object, according to one aspect of the present invention, there is provided a prismatic sealed battery module including: a prismatic battery case; an electrode plate group constituted by alternately layering positive and negative electrode plates with a separator interposed therebetween; and an electrolyte, wherein the positive or negative electrode plates protruding from both end faces of the electrode plate group are bonded to a collector member, and the collector member, which faces an inner surface of a side end wall of the battery case, has its central part connected to an external terminal. With this construction, a current-carrying path from each portion of the electrode plate to the collector member is made short, and the collector member has its central part connected to an external terminal. This helps suppress the connection resistance with respect to the external terminal, and thus a loss induced by electrical connection resistance is reduced.

According to another aspect of the invention, there is provided a prismatic sealed battery module including a prismatic battery case consisting of a plurality of prismatic cell cases, and the electrode plate group is disposed within each of the cell cases. Moreover, the electrode plates included in the electrode plate group are bonded to the collector member constituting at least part of a partition wall between adjacent cell cases, and the collector member, which faces the inner surface of the side end wall of the cell case at each end of the prismatic battery case, has its central part connected to the external terminal. With this construction, interconnection between the cells, of which each is constituted by disposing an electrode plate group in a cell case, is effected by directly connecting together the electrode plates of their electrode plate groups via the collector member. This makes it possible to obtain a short and straight connection path and thus reduce the connection resistance. Moreover, since the collector member constitutes part of the partition wall, no collector member is additionally provided. This makes cost reduction possible. Further, since there is no need to secure a space above the electrode plate group for establishing connection, the cell case is made smaller in volume, and thus the volumetric efficiency is improved.

According to still another aspect of the invention, there is provided a prismatic sealed battery module which includes an externally connection plate having a substantially L-shaped cross-sectional profile, which includes a fitting portion and a connecting portion adjoining thereto, the fitting portion making contact with the outer surface of the side end wall of the cell case, and the connecting portion making contact with an end of a longer side of the cell case. The fitting portion of the externally connection plate is fastened down by an externally connecting bolt, so that interconnection between the juxtaposed prismatic sealed battery modules is effected by bringing their connecting portions into contact with each other. With this construction, the externally connection plate functions as an external terminal, and thus prismatic sealed battery modules are connected together simply by being juxtaposed and bound together. Since there is no need to use a part for providing connection between the battery modules, such as a bus bar module, the number of constitution parts is reduced and also connecting operation becomes unnecessary. Consequently, both cost reduction and miniaturization are achieved.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

First Embodiment

Hereinafter, a first embodiment of a prismatic sealed battery module according to the present invention will be described with reference to FIGS. 1A and 1B.

Figure 1A:
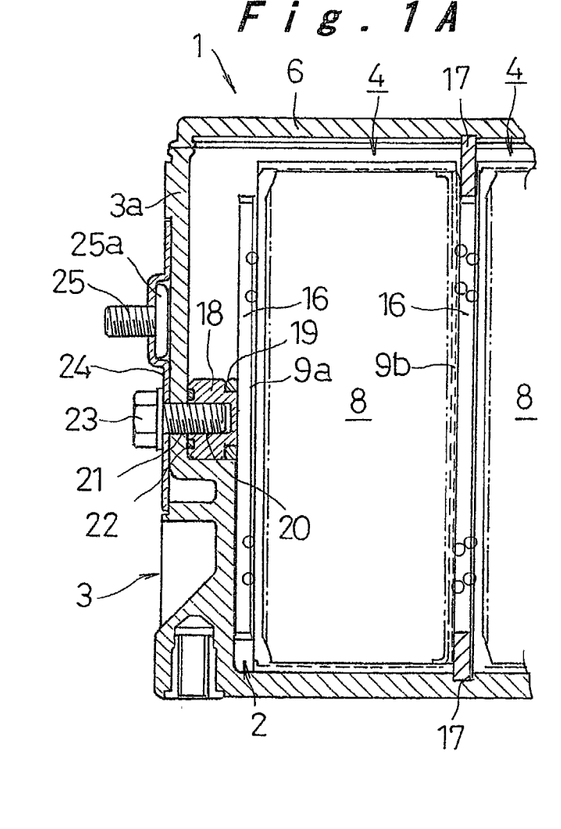
FIGS. 1A and 1B are views showing a prismatic sealed battery module according to a first embodiment of the present invention, with FIG. 1A being a partial longitudinal sectional view, and FIG. 1B being a side view.
Figure 1B:
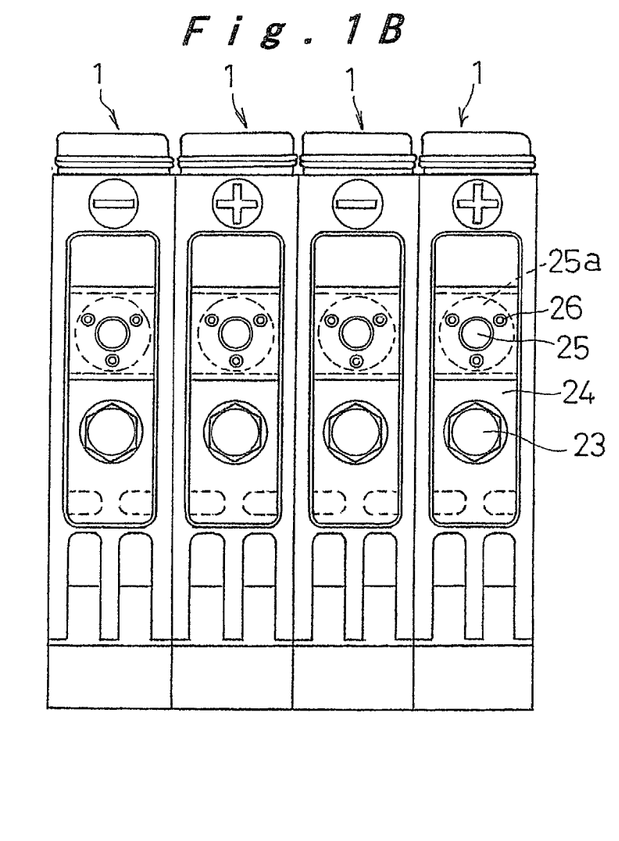

In FIGS. 1A and 1B, a prismatic sealed battery module 1 of the first embodiment incorporates a plurality of cells 2 made of nickel-metal hydride rechargeable batteries. The reference numeral 3 denotes a prismatic battery case, which is formed in the shape of a flat prism by juxtaposing prismatic cell cases 4 with a shorter side surface and a longer side surface, each of whose shorter side surfaces is common to adjacent such cell cases. An upper opening of the prismatic battery case 3 is sealed with an integrally-formed cover 6. The cell 2 is constituted by housing in the cell case 4 an electrolyte and an electrode plate group 8 formed by layering rectangular positive and negative electrode plates with a separator interposed therebetween. Part of the positive and negative electrode plates of the electrode plate group 8 extend sideways in mutually different directions so as to form leads 9a and 9b.

Figure 4A:
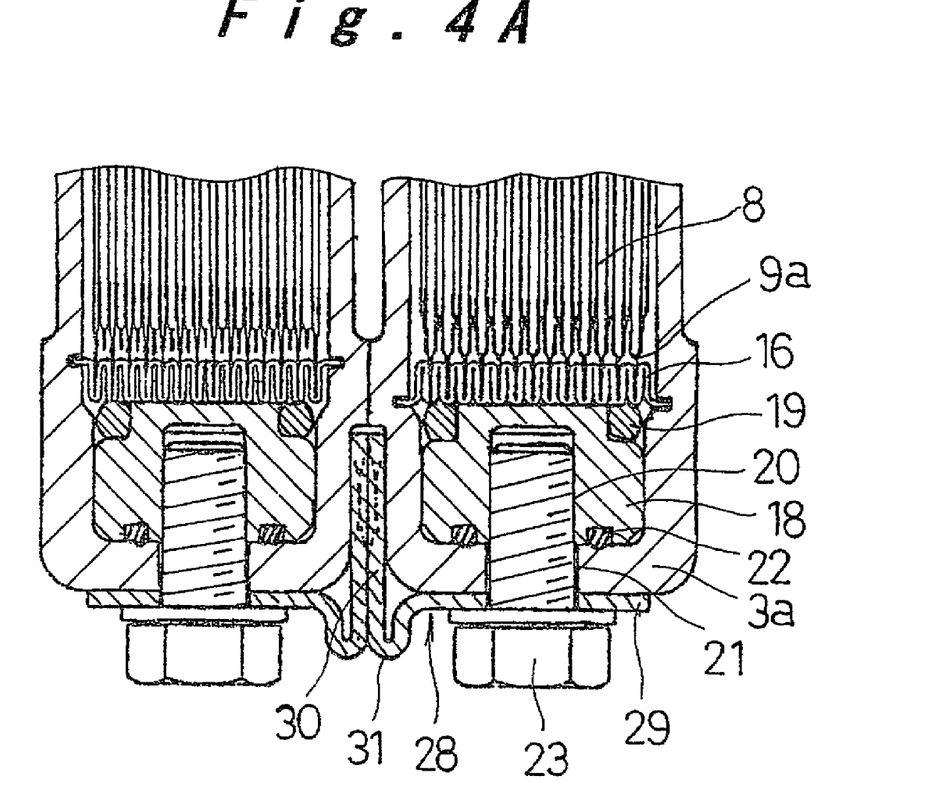
FIGS. 4A and 4B are views showing the structure of a principal portion of the third embodiment, with FIG. 4A being an enlarged horizontal sectional plan view, and FIG. 4B being a horizontal sectional plan view of an externally connection plate in an unconnected state.

Between the adjacent cell cases 4 and inside the shorter-side wall of each end of the prismatic battery case 3 are disposed collector members 16 each formed by folding an electrically conductive plate material in a corrugated shape (refer to FIG. 4A). After inserting the leads 9a and 9b of the positive and negative electrode plates into each concavely-curved part of the corrugation of the collector member 16, the corrugation is caulked and compressed, thus connecting the positive and negative electrode plates to the collector member 16.

The collector member 16 has its lengthwise ends fluid-tightly bonded, via a sealing material such as a pitch, to the side walls of the prismatic battery case 3, and also has its upper and lower ends integrally bonded to sealing partition materials 17 made of rubber or the like. The upper sealing partition material 17 is fluid-tightly bonded, via a sealing material such as a pitch, to a ceiling surface of the cover 6, and similarly the lower sealing partition material 17 is fluid-tightly bonded via a sealing material to an inner bottom surface of the prismatic battery case 3. In this way, the collector member 16 provides part of the partition wall between the adjacent cell cases 4, so that a plurality of the cells 2 housed in the prismatic battery case 3 are connected in series with one another via the collector members 16 constituting part of the partition wall.

In the manufacturing process, a predetermined number of electrode plate groups 8 are connected together via the collector members 16, and the assembly is intactly arranged in the prismatic battery case 3. Then, each end of the collector member 16 is fluid-tightly bonded to the side wall of the prismatic battery case 3, thus constituting the cell case 4 in which the electrode plate group 8 is arranged.

The electrode plate group 8 is constituted by alternately arranging a plurality of positive and negative electrode plates. More specifically, the positive electrode plates are each covered with a bag-like separator having an opening in the lateral direction, so that the positive and negative electrode plates are layered together with the separator interposed therebetween. The positive electrode plate, apart from the lead 9a, is formed by filling nickel hydroxide in Ni foamed metal. The lead 9a is formed by compressing foamed metal under pressure, and its one surface is seam-welded to a lead plate by ultrasonic welding. The negative electrode plate, apart from the lead 9b, is formed by coating a negative electrode material containing hydrogen-absorption alloy on Ni punched metal.

To the central part of the collector member 16, facing the inner surface of a side end wall 3a of the prismatic battery case 3, is fixed a metal connector 18 with a weld portion 19. The metal connector 18 has a screw hole 20 formed at its end face facing the side end wall 3a. The side end wall 3a has a bolt hole 21 formed concentrically with the screw hole 20. Around the screw hole 20 is disposed an O ring 22, acting as a sealing material, to secure fluid tightness. On the outer surface of the side end wall 3a is arranged a connection plate 24 to which a plate 25a for mounting an external terminal 25 is fixed with a spot weld portion 26. An externally connecting bolt 23, penetrating through the connection plate 24 and the bolt hole 21, is threadedly engaged in the screw hole 20, thus allowing the connection plate 24 to be fastened to the side end wall 3a.

According to the prismatic sealed battery module 1 thus constructed, in each of the cells 2, the electrode plates are connected together by disposing the collector member 16 at each end of the electrode plate group 8. This arrangement helps reduce the length of the current-carrying path from each electrode plate to the collecting member 16. Moreover, the connection is established by inserting the leads 9a and 9b into each concavely-curved part of the corrugated collector member 16, followed by caulking. This makes it possible to increase the contact area of the connecting portions, and thereby obtain a highly reliable connection condition and reduce the connection resistance. Further, interconnection between the cells 2 is effected by directly connecting together the electrode plates of the electrode plate group 8 via the collector member 16. This makes it possible to obtain a short and straight connection path, to increase the connection area, to reduce the connection resistance, and to suppress the internal resistance.

The collector member 16 constitutes part of the partition wall between the adjacent cell cases 4. This eliminates the need to additionally provide a collector member, and thus makes cost reduction possible. Moreover, since there is no need to secure a space above the electrode plate group 8 for providing connection between the cells 2, the cell case 4 is made smaller in volume, and thus the volumetric efficiency is improved.

The collector member 16 and the external terminal 25 are connected together as follows. Firstly, the metal connector 18 is welded to the central part of the collector member 16 facing the inner surface of the side end wall 3a of the prismatic battery case 3. Thereafter, the connection plate 24, to which the external terminal 25 is attached, is arranged on the outer surface of the side end wall 3a. Subsequently, the connection plate 24 is fastened to the metal connector 18 using the externally connecting bolt 23. With this procedure, a sufficiently large current-carrying area is provided in the connecting portion and thus the connection resistance is reduced. Hence, a loss induced by electrical connection resistance is suppressed.

Since the external terminal 25 is provided independently of the externally connecting bolt 23 by means of the connection plate 24, the external terminals 25 of the prismatic sealed battery modules 1, juxtaposed as shown in FIG. 1B, are connected together without adversely affecting the junction between the externally connecting bolt 23 and the collector member 16. Hence, a highly reliable connection condition is achieved.

Second Embodiment

Figure 2A:
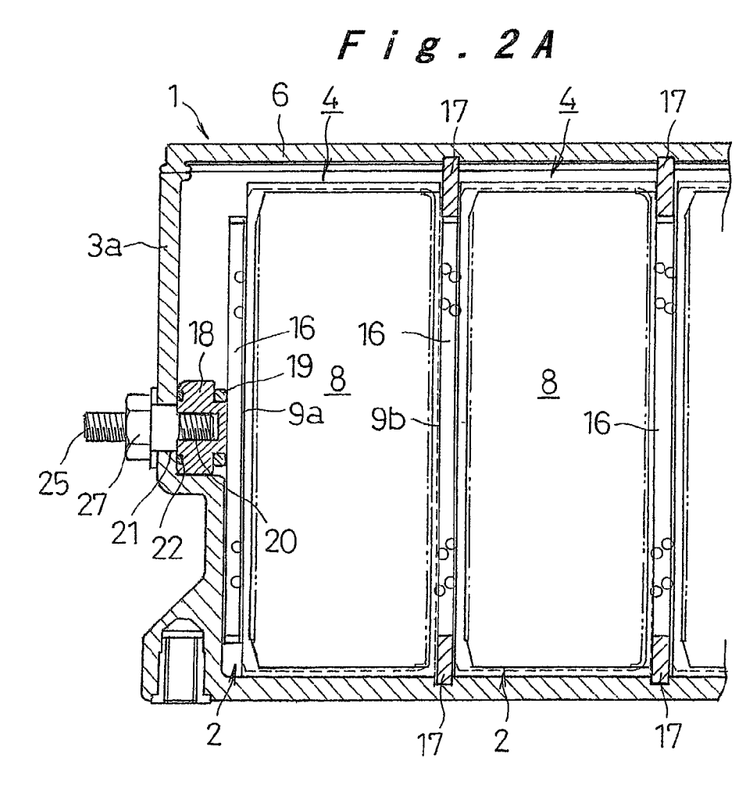
FIGS. 2A and 2B are views showing a prismatic sealed battery module according to a second embodiment of the invention, with FIG. 2A being a partial longitudinal sectional view, and FIG. 2B being a side view.
Figure 2B:
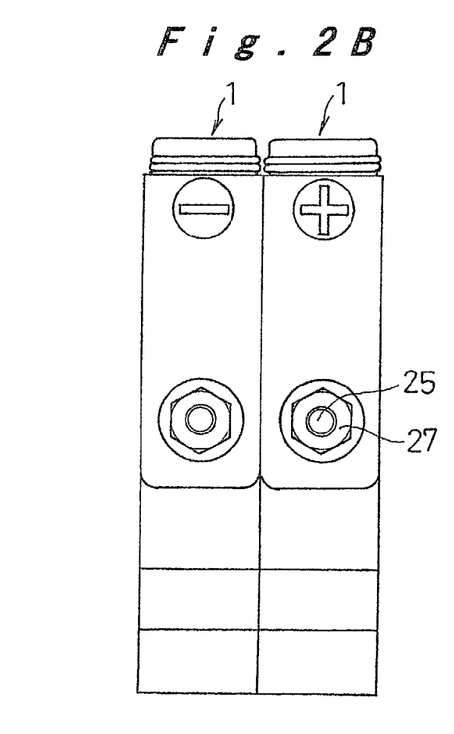

Next, a second embodiment of the prismatic sealed battery module according to the invention will be described with reference to FIGS. 2A and 2B. Note that, in the descriptions connected to the second embodiment, such elements as are found also in the previous embodiment are identified with the same reference numerals and symbols, and the descriptions thereof will be omitted. That is, only the points of difference will be described below.

In this embodiment, instead of the externally connecting bolt 23 of the first embodiment, an externally connecting bolt 27 is used that is provided integrally with a concentrically-formed external terminal 25.

According to the second embodiment, there is no need to additionally provide the connection plate 24, to which the external terminal 25 is fixed, as used in the first embodiment. Thus, the number of constitution parts is reduced, thereby making cost reduction possible.

Third Embodiment

Next, a third embodiment of the prismatic sealed battery module according to the invention will be described with reference to FIGS. 3A through 4B.

In this embodiment, instead of the connection plate 24 of the first embodiment with the external terminal 25 attached to it, there is provided an externally connection plate 28 having a substantially L-shaped cross-sectional profile. As shown in FIGS. 3A through 4B, the external connection plate 28 includes a fitting portion 29 and a connecting portion 30 adjoining thereto. The fitting portion 29 makes contact with the outer surface of the side end wall 3a of the prismatic battery case 3, and the connecting portion 30 makes contact with the end of the longer side of the prismatic battery case 3. The fitting portion 29 is fastened to the metal connector 18 with the externally connecting bolt 23. In a bend between the fitting portion 29 and the connecting portion 30 is provided a U-shaped elastic portion 31. As shown in FIG. 4B, the connecting portion 30 has a press-contact projection 32 formed so as to protrude toward the outer surface.

Figure 3A:
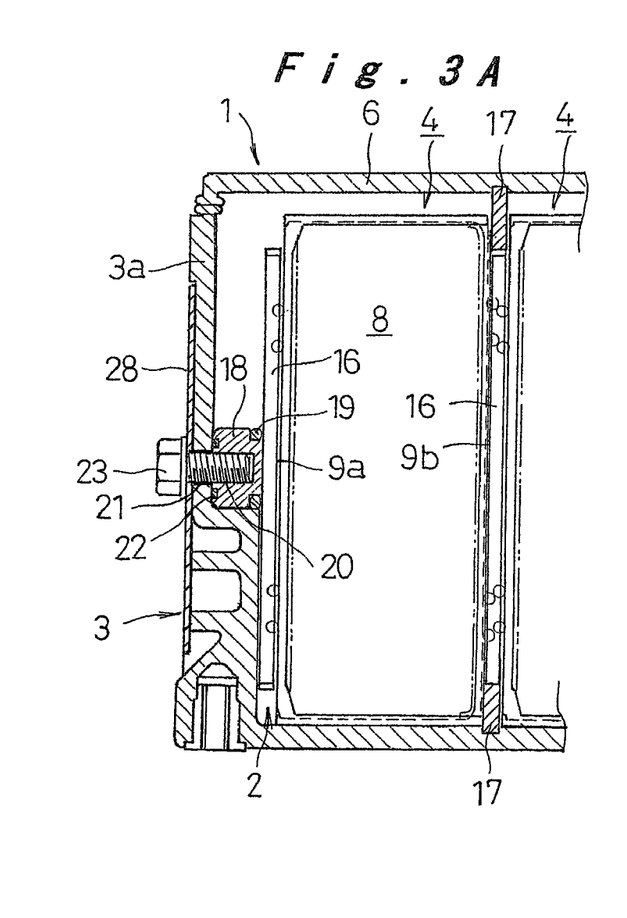
FIGS. 3A and 3B are views showing a prismatic sealed battery module according to a third embodiment of the invention, with FIG. 3A being a partial longitudinal sectional view, and FIG. 3B being a side view.
Figure 3B:
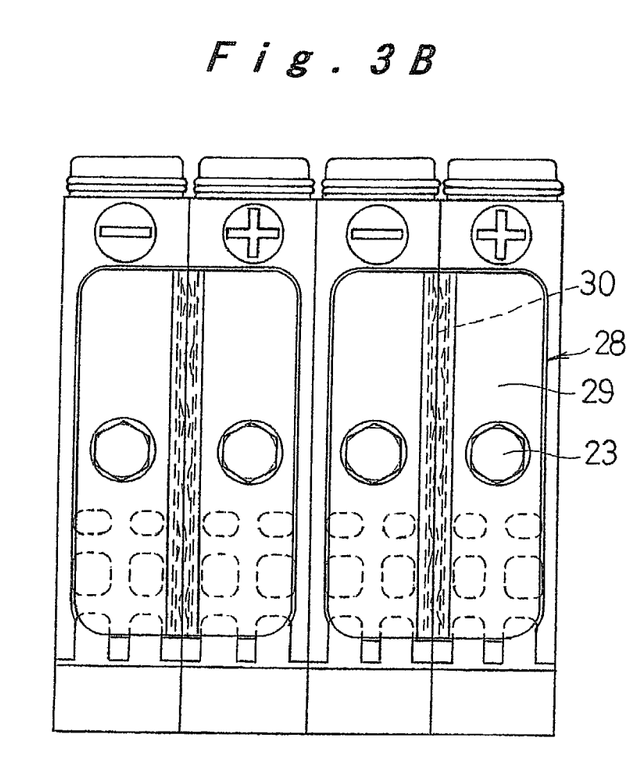
Figure 4B:
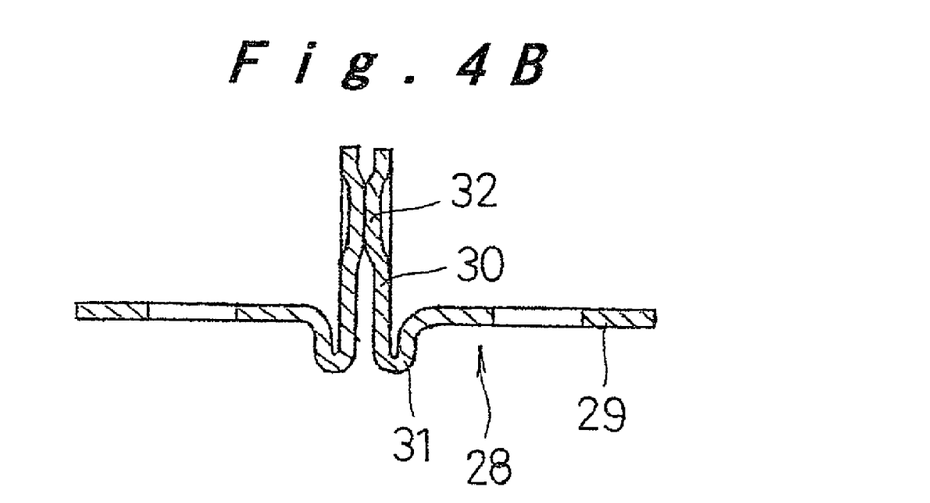

According to the third embodiment, as shown in FIGS. 3B and 4A, a plurality of prismatic sealed battery modules 1 are connected together simply by being juxtaposed and bound together in the juxtaposition direction, because the connecting portions 30 of the externally connection plates 28 are brought into contact with each other. Thus, there is no need to prepare a part for providing connection between the external terminals 25, such as a bus bar module, and the connecting operation becomes unnecessary. Consequently, both cost reduction and miniaturization are achieved.

Moreover, the U-shaped elastic portion 31 is provided between the fitting portion 29 and connecting portion 30 of the externally connection plate 28. Since this U-shaped elastic portion 31 serves to absorb the dimensional tolerance of the prismatic battery case 3 or the externally connection plate 28, a stable connection condition is ensured. In addition, since the press-contact projection 32 is protrudingly formed in the connecting portion 30, it is possible to ensure that the connecting portions 30 are kept press-contacted to each other. Consequently, the connection resistance is suppressed stably.

The embodiments described hereinabove exemplify the prismatic sealed battery module 1 of the type that incorporates a plurality of cells 2 and in which the cells 2 are directly connected together via the collector member 16 constituting part of the partition wall between the adjacent cell cases 4 of the cells 2. Alternatively, even if the prismatic sealed battery module 1 is composed of a single cell, by applying the present invention, the connection resistance between the electrode plate group and the external terminal is suppressed. Moreover, a collector member in use is not limited to the corrugated collector member 16, but may be of a collector member shaped like a flat plate. In this case, the lead 9a or 9b of each electrode plate of the electrode plate group 8 may be connected to the collector member by bonding using solder or an electrically conductive adhesive, or by press contacting, or by resistance welding in a press-contacted state. It is also possible to employ such a structure that the electrode plate group 8 has its side ends each bonded to the collector member and these collector members are bonded together.

As described heretofore, according to the prismatic sealed battery module embodying the present invention, the positive or negative electrode plate, protruding from each end face of the electrode plate group, is bonded to the collector member, and the external terminal is connected to the central part of the collector member facing the inner surface of the side end wall of the battery case. Thus, the current-carrying path from each portion of the electrode plate to the collector member is made short. Moreover, since the external terminal is connected to the central part of the collector member, the connection resistance with respect to the external terminal is reduced. Hence, a loss induced by electrical connection resistance is successfully suppressed.

Further, there is provided the prismatic sealed battery module including the prismatic battery case composed of a plurality of prismatic cell cases. The electrode plates of the electrode plate group within each cell case is bonded to the collector member constituting at least part of the partition wall between the adjacent cell cases, and the external terminal is connected to the central part of the collector member facing the inner surface of the side end wall of the cell case at each end of the prismatic battery case. Thereupon, interconnection between the cells is effected by directly connecting together the electrode plates of their electrode plate groups via the collector member. This makes it possible to obtain a short and straight connection path and thus reduce the connection resistance. Moreover, the collector member constitutes part of the partition wall, and this eliminates the need to additionally provide a collector member. Thus, cost reduction is achieved. Further, since there is no need to secure a space above the electrode plate group for providing connection, the cell case is made smaller in volume, and thus the volumetric efficiency is improved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic sealed battery module comprising:
   electrode plate groups each constituted by alternately layering positive and negative electrode plates with a separator interposed therebetween;
   an electrolyte;
   a prismatic battery case for accommodating the electrode plate groups and the electrolyte;
   the positive or negative electrode plates protruding from an end face of at least one of the electrode plate groups being bonded to a first collector member,
   an external terminal connected to a central part of the first collector member facing an inner surface of a side end wall of the battery case,
   said electrode plate groups having side edges;
   a second collector member directly contacting and connecting the side edges of adjacent ones of the electrode plate groups, said second collector member being located between said side edges to serve as both a collector member and a partition wall between said adjacent electrode plate groups and provide a current path limited to a space between said side edges of said adjacent electrode plate groups.

2. The prismatic sealed battery module according to claim 1, further comprising:
   the prismatic battery case having a plurality of prismatic cell cases with the second collector member forming a common wall between two of said prismatic cell cases, each of said electrode plate groups being disposed within each of the cell cases; and
   another external terminal being connected to a central part of a third collector member facing an inner surface of another side end wall of the battery case at an opposing end from the external terminal of the prismatic battery case.

3. The prismatic sealed battery module according to claim 1, wherein the collector member extends substantially the entire length of side edges of adjacent electrode plate groups.

4. The prismatic sealed battery module according to claim 1, wherein said electrode plate groups comprise side edges and a single collector member connects the side edges of adjacent electrode plate groups.

5. The prismatic sealed battery module according to claim 1, wherein said electrode plate groups comprise side edges and a collector member connects the side edges of adjacent electrode plate groups such that no additional connection is necessary to electrically connect the electrode plate groups.

6. The prismatic sealed battery module according to claim 1, wherein the collector member is corrugated.

7. The prismatic sealed battery module according to claim 1, wherein an end of the collector member is fluid-tightly bonded to a side wall of the prismatic battery case.

8. The prismatic sealed battery according to claim 1, wherein said current path has a length equal to a distance between said side edges of said adjacent electrode plate groups.

9. A prismatic sealed battery module comprising:
   at least one electrode plate group constituted by alternately layering positive and negative electrode plates with a separator interposed therebetween;
   an electrolyte; and
   a prismatic battery case for accommodating the at least one electrode plate group and the electrolyte, wherein
   the positive or negative electrode plates protruding from both end faces of the at least one electrode plate group are bonded to a collector member,
   an external terminal is connected to a central part of the collector member facing an inner surface of a side end wall of the prismatic battery case,
   a metal connector is fixed to the central part of the collector member facing the inner surface of the side end wall,
   a sealing material is arranged at an outer periphery of a contact surface between the metal connector and the inner surface of the side end wall, and
   an externally connecting bolt is fastened through the side end wall to the metal connector.

10. The prismatic sealed battery module according to claim 9, wherein the external terminal is fixed to a connection plate which is arranged on an outer surface of the side end wall of the battery case and is fastened thereto by the externally connecting bolt.

11. The prismatic sealed battery module according to claim 9, wherein the externally connecting bolt is provided with the external terminal.

12. The prismatic sealed battery module according to claim 9, further comprising:

an externally connection plate having a substantially L-shaped cross-sectional profile, which includes a fitting portion and a connecting portion adjoining thereto, the fitting portion making contact with an outer surface of the side end wall of the battery case, and the connecting portion making contact with an end of a longer side surface of the battery case, wherein the fitting portion of the externally connection plate is fastened down by the externally connecting bolt, so that interconnection between juxtaposed prismatic sealed battery modules is effected by bringing their connecting portions into contact with each other.

13. The prismatic sealed battery module according to claim 12, further comprising a U-shaped elastic portion arranged at a bend of the externally connection plate between the fitting portion and connecting portion.

14. The prismatic sealed battery module according to claim 12, wherein a press-contact projection is protrudingly formed in the connecting portion of the externally connection plate.

* * * * *